United States Patent
O'Rourke et al.

(10) Patent No.: US 12,543,628 B2
(45) Date of Patent: Feb. 10, 2026

(54) METHODS AND SYSTEMS FOR MEASURING DUTY CYCLE AND PULSE FREQUENCY OF SENSORS TO DETERMINE SEED OR PARTICLE METRICS

(71) Applicant: Precision Planting LLC, Tremont, IL (US)

(72) Inventors: Brendan O'Rourke, Pekin, IL (US); William Frank, Manito, IL (US); Tanner Gray, Green Valley, IL (US); Jonathon Jellison, Tremont, IL (US); Ryan Allgaier, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 144 days.

(21) Appl. No.: 18/546,305

(22) PCT Filed: Feb. 14, 2022

(86) PCT No.: PCT/IB2022/051291
§ 371 (c)(1),
(2) Date: Aug. 14, 2023

(87) PCT Pub. No.: WO2022/189871
PCT Pub. Date: Sep. 15, 2022

(65) Prior Publication Data
US 2024/0180067 A1 Jun. 6, 2024

Related U.S. Application Data

(60) Provisional application No. 63/183,118, filed on May 3, 2021, provisional application No. 63/159,993, filed on Mar. 12, 2021.

(51) Int. Cl.
*A01C 7/10* (2006.01)
*A01B 49/06* (2006.01)
(Continued)

(52) U.S. Cl.
CPC ............ *A01C 7/105* (2013.01); *A01B 79/005* (2013.01); *A01C 21/005* (2013.01); *A01B 49/06* (2013.01); *A01C 7/107* (2013.01)

(58) Field of Classification Search
CPC ....... A01C 7/105; A01C 21/005; A01C 7/107; A01C 19/02; A01C 21/00; A01B 79/005; A01B 49/06
(Continued)

(56) References Cited

U.S. PATENT DOCUMENTS

| | | |
|---|---|---|
| 4,307,390 A | 12/1981 | Steffen et al. |
| 5,969,340 A | 10/1999 | Dragne et al. |

(Continued)

FOREIGN PATENT DOCUMENTS

| | | |
|---|---|---|
| AU | 619787 B2 | 2/1992 |
| EP | 0988779 A1 | 3/2000 |

(Continued)

*Primary Examiner* — David J Walczak

(57) ABSTRACT

An electrical control system comprises a display device to display data and at least one sensor to detect or measure a duty cycle and to detect or measure a pulse frequency from a sensor output for sensing flow of a product or particle through a product or particle line of an agricultural implement. Processing logic is coupled to the at least one sensor. The processing logic is configured to determine an amount of product or particles flowing through the product or particle line of the agricultural implement based on the measured duty cycle and the measured pulse frequency of the at least one sensor.

21 Claims, 13 Drawing Sheets

(51) Int. Cl.
*A01B 79/00* (2006.01)
*A01C 21/00* (2006.01)

(58) Field of Classification Search
USPC .................................. 222/23, 25, 27, 30, 40
See application file for complete search history.

(56) References Cited

U.S. PATENT DOCUMENTS

| | | | |
|---|---|---|---|
| 6,070,539 | A | 6/2000 | Flamme et al. |
| 6,093,926 | A | 7/2000 | Mertins et al. |
| 6,208,255 | B1 | 3/2001 | Conrad et al. |
| 8,078,367 | B2 | 12/2011 | Sauder et al. |
| 8,386,137 | B2 | 2/2013 | Sauder et al. |
| 9,955,625 | B2 | 5/2018 | Baurer et al. |
| 11,589,500 | B2 * | 2/2023 | Johnson .................... A01C 7/20 |
| 11,770,995 | B2 * | 10/2023 | Garner ..................... A01C 7/16 |
| | | | 111/11 |
| 2003/0159633 | A1 | 8/2003 | Upadhyaya et al. |
| 2008/0265141 | A1 | 10/2008 | Leuenberger et al. |
| 2010/0269470 | A1 | 10/2010 | Price |
| 2012/0036914 | A1 | 2/2012 | Landphair et al. |
| 2014/0191857 | A1 | 7/2014 | Sauder et al. |
| 2015/0094916 | A1 | 4/2015 | Bauerer et al. |
| 2016/0143211 | A1 | 5/2016 | Baker |
| 2017/0055437 | A1 | 3/2017 | Thompson |
| 2018/0014456 | A1 | 1/2018 | Conrad et al. |
| 2018/0184578 | A1 | 7/2018 | Stuber |
| 2019/0232304 | A1 | 8/2019 | Grimm et al. |
| 2019/0289780 | A1 | 9/2019 | Wonderlich et al. |
| 2021/0267118 | A1 | 9/2021 | Plattner |

FOREIGN PATENT DOCUMENTS

| | | | | |
|---|---|---|---|---|
| WO | | 2017197274 A1 | 11/2017 | |
| WO | | 2018204196 A1 | 11/2018 | |
| WO | | 2019070617 A1 | 4/2019 | |
| WO | | 2019099748 A1 | 5/2019 | |
| WO | | 2019169369 A1 | 9/2019 | |
| WO | WO 2020/049387 | * | 3/2020 | ............... A01C 7/10 |
| WO | | 2020240301 A1 | 12/2020 | |

* cited by examiner

METHODS AND SYSTEMS FOR MEASURING DUTY CYCLE AND PULSE FREQUENCY OF SENSORS TO DETERMINE SEED OR PARTICLE METRICS

CROSS-REFERENCE TO RELATED APPLICATIONS

This application is a national phase entry under 35 U.S.C. § 371 of International Patent Application PCT/IB2022/051291, filed Feb. 14, 2022, designating the United States of America and published in English as International Patent Publication WO 2022/189871 A1 on Sep. 15, 2022, which claims priority to U.S. Provisional Patent Application Nos. 63/159,993, filed 11 Mar. 2021, and 63/183,118, filed 3 May 2021, the disclosure of each is incorporated herein by reference in their entireties.

TECHNICAL FIELD

Embodiments of the present disclosure relate to methods and systems for measuring duty cycle and pulse frequency of sensors to determine seed or particle metrics.

BACKGROUND

Air seeders have a primary distribution system and a secondary distribution system. Seeds and optionally fertilizer are fed from hoppers into the primary distribution system and are conveyed by air to the secondary distribution system. A manifold between the primary distribution system and the secondary distribution system divides the feed so that the secondary distribution system delivers seeds/fertilizer to each row. Seeds/fertilizer are conveyed by air.

Seed or fertilizer sensors on agricultural equipment have typically been optical sensors. When a particle (seed or fertilizer) passes through the optical sensor a light beam is broken and a particle is then detected. The frequency of these particle detections can be used to determine planting populations if the frequency is low enough. However, for higher flow crops like wheat or fertilizer, typical optical sensors sizes of 25 mm or 32 mm do not have a large enough cross sectional area to sense individual particles, therefore making the particle counts from these sensors unreliable and inaccurate.

BRIEF DESCRIPTION OF THE DRAWINGS

The present disclosure is illustrated by way of example, and not by way of limitation, in the figures of the accompanying drawings and in which.

BRIEF SUMMARY

In one embodiment, an electrical control system comprises a display device to display data and at least one sensor to detect or measure a duty cycle and to detect or measure a pulse frequency from a sensor output for sensing flow of a product or particle through a product or particle line of an agricultural implement. Processing logic is coupled to the at least one sensor. The processing logic is configured to determine an amount of product or particles flowing through the product or particle line of the agricultural implement based on the measured duty cycle and the measured pulse frequency of the at least one sensor.

DETAILED DESCRIPTION

All references cited herein are hereby incorporated by reference in their entireties. However, in the event of a conflict between a definition in the present disclosure and one in a cited reference, the present disclosure controls.

Figure 1:
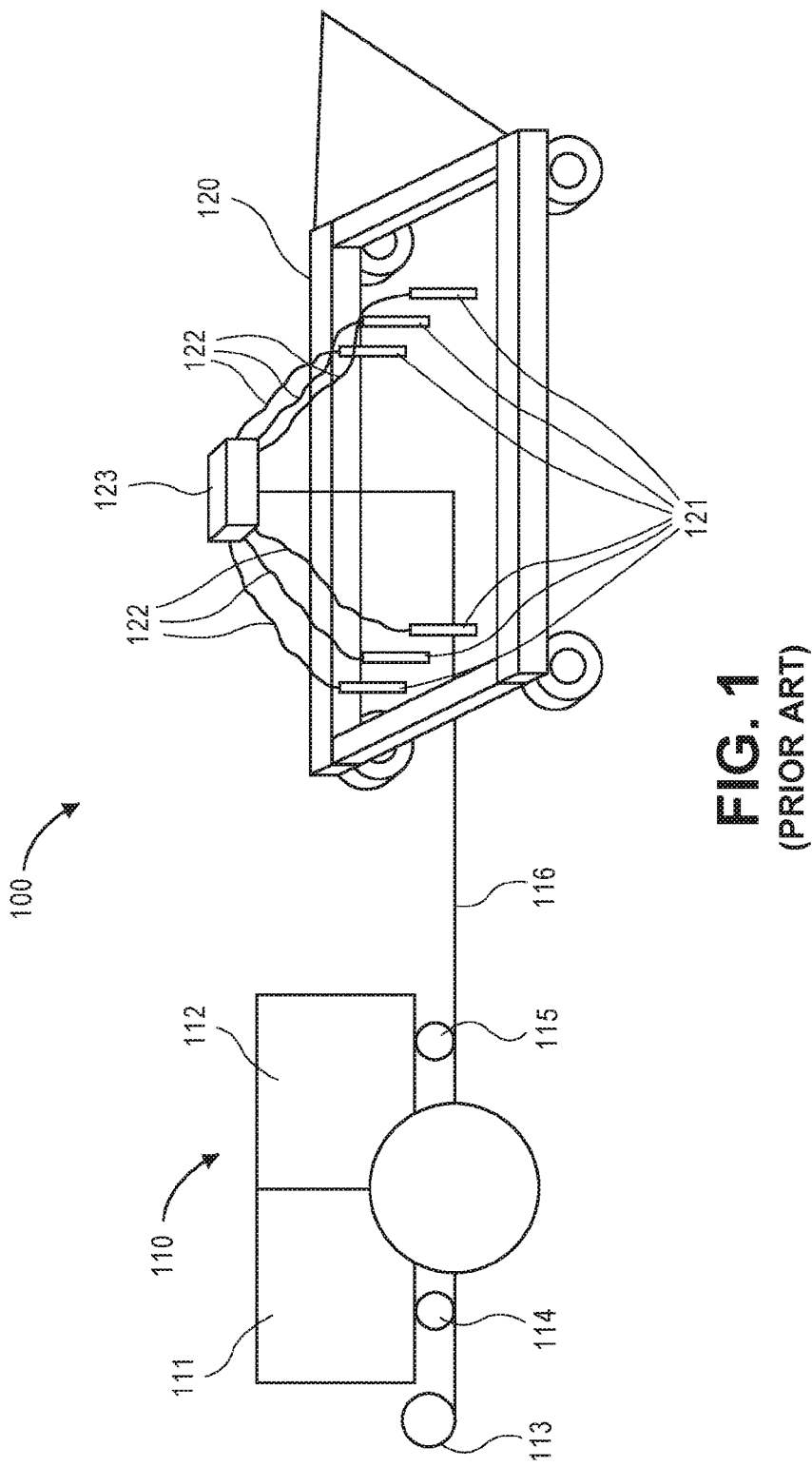
FIG. 1 illustrates a prior art air seeder.

FIG. 1 illustrates a typical air seeder 100. Air seeder 100 includes a cart 110 and frame 120. Cart 110 has hopper 111 and hopper 112 for storing seed and fertilizer, respectively. A main product line 116 is connected to a fan 113 for conveying seed and fertilizer conveyed from meter 114 and meter 115, respectively. Main product line 116 feeds seed and fertilizer to manifold tower 123. Seed and fertilizer are distributed through manifold tower 123 to secondary product lines 122 to openers 121.

While the description below is for control of the manifold tower 123 of one section of an air seeder 100, the same system can be applied to each section.

Figure 2:
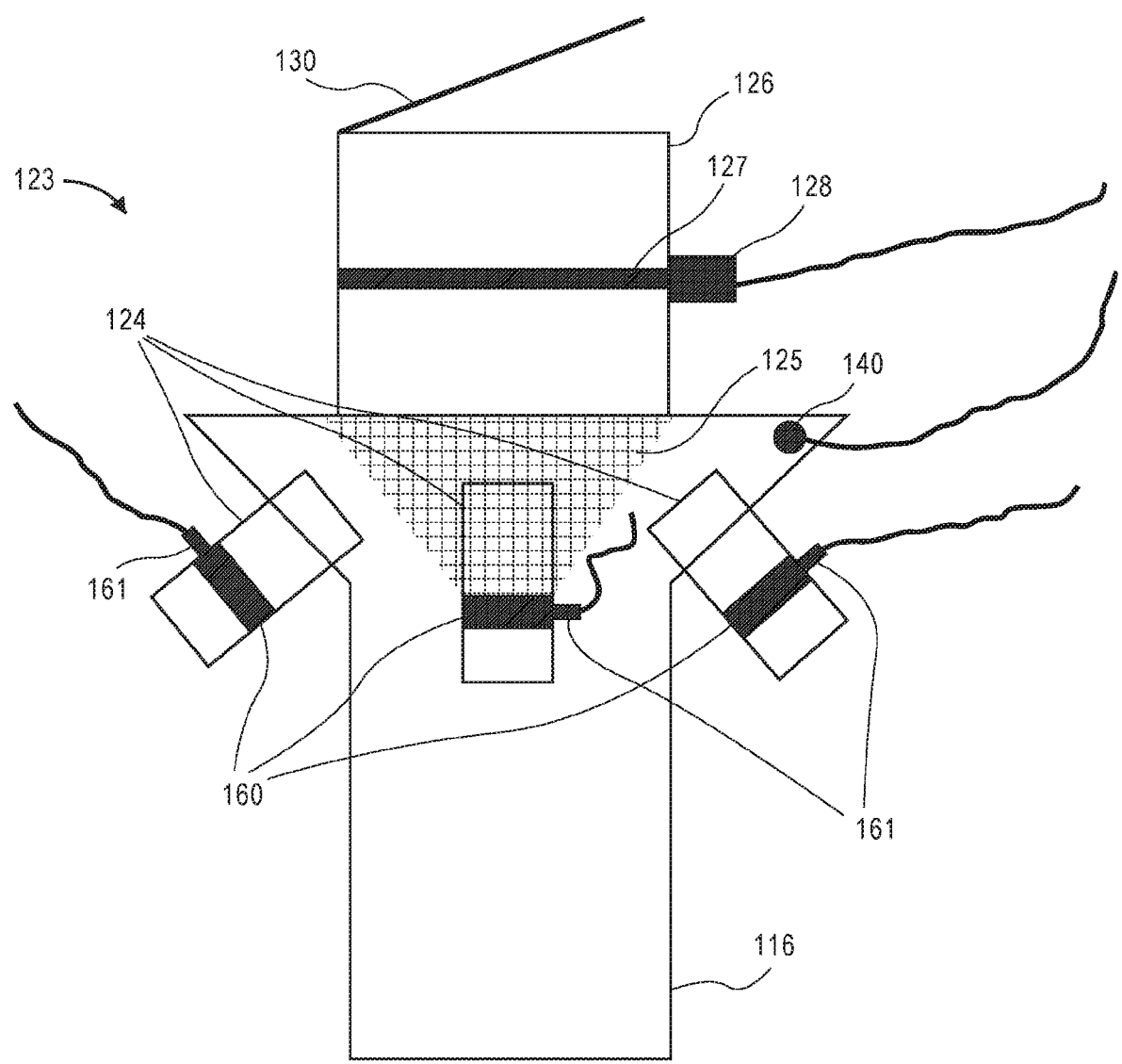
FIG. 2 illustrates an air seeder tower having a vent valve and an actuator for the valve according to one embodiment.

FIG. 2 illustrates manifold tower 123. Manifold tower 123 has main product line 116 providing seed and optionally fertilizer in a flow of air. Seed/fertilizer impact screen 125, which has a mesh size to prevent passage of seed and/or fertilizer. Seeds/fertilizer fall into outlets 124 (or exit ports) and feed into secondary product lines 122. Above screen 125 is a tower 126 which contains a valve 127. Valve 127 can be any type of valve that can be actuated. In one embodiment, valve 127 is a butterfly valve. Valve 127 is actuated by actuator 128, which is disposed on tower 126. Actuator 128 is in signal contact with electrical control system 300. Optionally, a lid 130 is pivotally attached to tower 126 to cover tower 126 when no air is flowing. When air is flowing, lid 130 raises by the force of air flowing through tower 126, and when air is not flowing, lid 130 closes tower 126.

In one embodiment, which is illustrated in FIG. 2, manifold tower 123 further includes a pressure sensor 140 disposed in the manifold tower 123. In another embodiment, pressure sensor 140 is disposed in at least one secondary product line 122. Pressure sensor 140 is in signal communication with electrical control system 300. This can provide a closed loop feedback control of valve 127. In another embodiment, electrical control system 300 measures the pressure at pressure sensor 140 in the manifold tower 123 and the pressure sensor 140 in the secondary product line 122 and calculates a difference between each pressure sensor. Electrical control system 300 can control based on the pressure difference.

Figure 3:
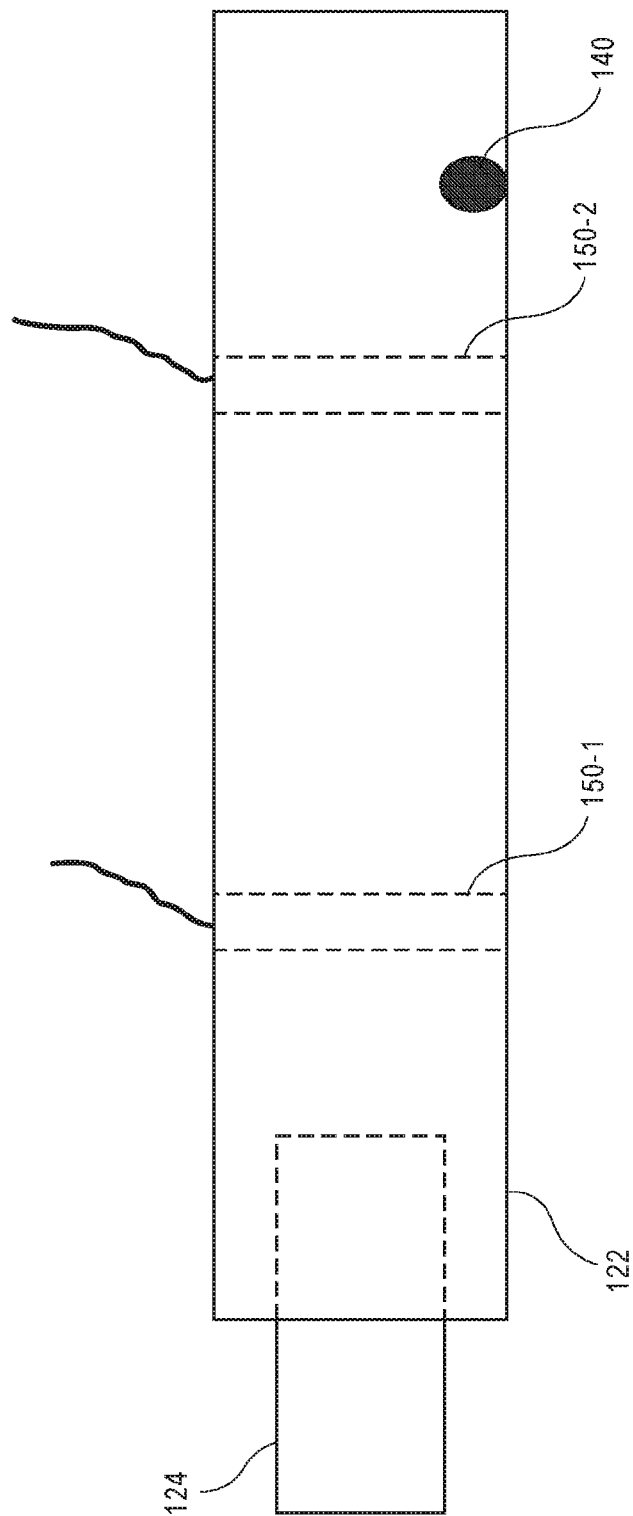
FIG. 3 illustrates a secondary product line having flow sensors according to one embodiment.

In another embodiment, which is illustrated in FIG. 3, there are a first particle sensor 150-1 and a second particle sensor 150-2 disposed serially within at least one secondary product line 122. First particle sensor 150-1 and second particle sensor 150-2 can be disposed individually or as parts within one unit. First particle sensor 150-1 and second particle sensor 150-2 are spaced at a distance such that a waveform measured at the first particle sensor 150-1 will be duplicated at the second particle sensor 150-2. As seeds travel through an air seeder, they will not flow in a uniform distribution all of the time. In a selected cross section, there can be one, two, three, four, five, or more seeds together. As the seeds travel over a distance, the distribution of seeds in each grouping can expand or condense. Over a short distance, the grouping will remain uniform. Each grouping of seeds will generate a different waveform in a particle sensor. The waveforms from a plurality of groupings will create a pattern in the first particle sensor 150-1. When this pattern is then detected at the second particle sensor 150-2, the time difference between each of these measurements is then divided by the distance between first particle sensor 150-1 and second particle sensor 150-2 to determine the speed of seeds/fertilizer in the secondary product line 122. Using the speed, electronic control system 300 can actuate actuator 128 to change the amount of air exiting tower 126 to change the speed of seed/fertilizer in the secondary product line 122.

An example of a particle sensor is Wavevision Sensor from Precision Planting LLC, and which is described in U.S. Pat. No. 6,208,255. First particle sensor 150-1 and second particle sensor 150-2 are in signal communication with electrical control system 300. This can provide a closed loop feedback control of valve 127.

While both the pressure sensor 140 and the particle sensors 150-1, 150-2 are illustrated, only one is needed for the closed loop feedback control.

Figure 7:
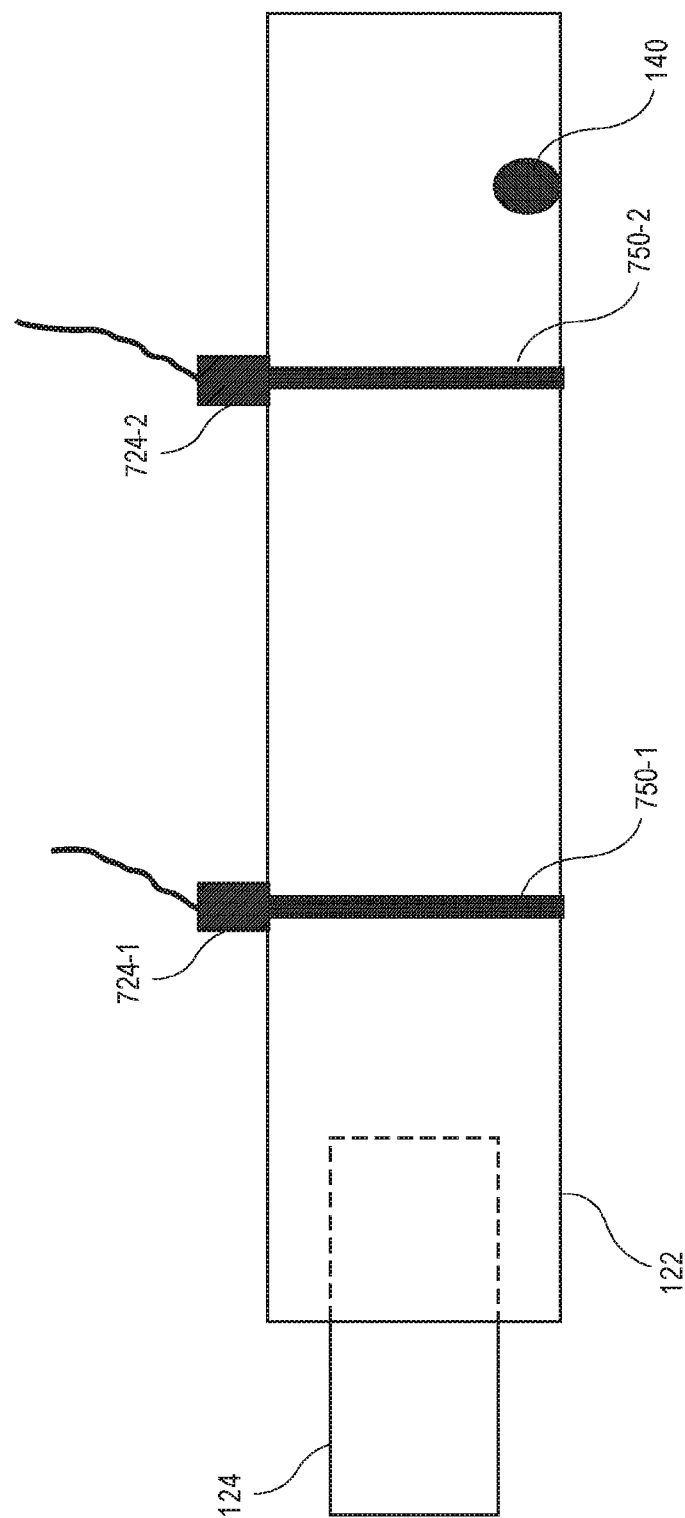
FIG. 7 illustrates a secondary product line 122 that contains at least one valve (e.g., 750-1, 750-2) and at least one corresponding actuator (e.g., 724-1, 724-2) in accordance with one embodiment.

In another embodiment that is illustrated in FIG. 2, there can be at least one valve (e.g., valve 160) disposed in each outlet 124 (or exit port) and actuated by actuator 161, which is in signal communication with electrical control system 300. Each actuator 161 (or actuators) can be individually controlled to further regulate flow with at least one valve in each secondary product line 122. Each secondary product line 122 can contain at least one valve (e.g., 750-1, 750-2) and corresponding actuator (e.g., 724-1, 724-2) as illustrated in FIG. 7. This can provide fine-tuned control in each secondary product line 122 separate from other secondary product lines 122. The pressure sensor 140, an ultrasonic speed sensor, or particle sensors 150-1, 150-2 in each secondary product line 122 can provide the measurement for controlling each actuator. In one embodiment, particle sensor 150-1, 150-2 can be any sensor with a signal output with a duration proportional to the time the sensor is blocked by particle(s) passing the sensor.

Figure 4:
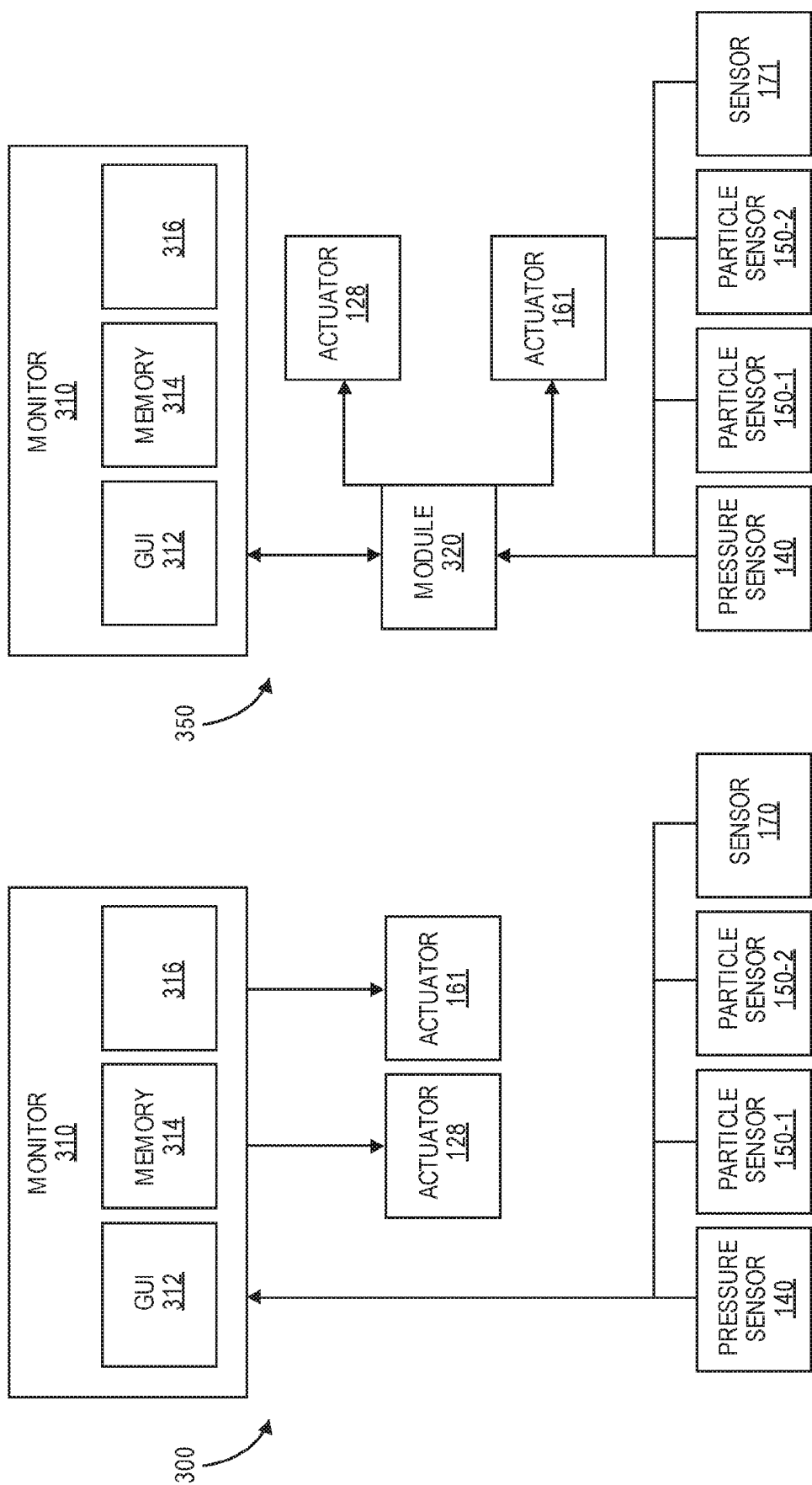
FIG. 4A schematically illustrates an embodiment of an electrical control system for controlling an actuator.
FIG. 4B schematically illustrates an embodiment of an electrical control system for controlling an actuator.

Electrical control system 300 is illustrated schematically in FIG. 4A in accordance with one embodiment. In the electrical control system 300, the monitor 310 is in signal communication with actuator 128, actuator 161, pressure sensor 140, fluid velocity sensor 170, and particle sensors 150-1, 150-2. It should be appreciated that the monitor 310 comprises an electrical controller. Monitor 310 includes processing logic 316 (e.g., a central processing unit (CPU) 316), a memory 314, and optionally a graphical user interface (GUI) 312, which allows a user to view and enter data into the monitor 310. The monitor 310 can be of a type disclosed in U.S. Pat. No. 8,386,137. For example, monitor 310 can be a planter monitor system that includes a visual display and user interface, preferably a touch screen graphic user interface (GUI). The touchscreen GUI is preferably supported within a housing which also houses a microprocessor, memory and other applicable hardware and software for receiving, storing, processing, communicating, displaying and performing various features and functions. The planter monitor system preferably cooperates and/or interfaces with various external devices and sensors.

An alternative electrical control system 350 is illustrated in FIG. 4B, which includes a module 320 (e.g., circuitry 320). Module 320 receives signals from pressure sensor 140, fluid velocity sensor 171, and particle sensors 150-1, 150-2, which can be provided to monitor 310 to output on GUI 312. Module 320 can also provide control signals to actuator 128 and actuator 161, which can be based on operator input into monitor 310.

In operation of the closed loop feedback control, monitor 310 receives a signal from the pressure sensor, fluid velocity sensor, and/or particle sensors 150-1, 150-2. The monitor 310 uses the pressure signal, fluid velocity signal, and/or the particle signal to set a selected position of actuator 128 to control valve 127 to regulate the amount of air leaving tower 126. Monitor 310 sends a signal to actuator 128 to effect this change. This in turn controls the amount of air flow in secondary product lines 122 to convey seeds/fertilizer to the trench with the appropriate force and/or speed to place the seeds/fertilizer in the trench without having the seeds/fertilizer bounce out of the trench.

In one example, the module 320 is located on an implement or on a tractor. The module 320 receives sensor data from the sensors that are located on an implement. The module processes the sensor data to perform operations of methods discussed herein or the module sends the sensor data to processing logic to perform operations of methods discussed herein.

In addition to measuring pressure or the velocity of the particle, the velocity of the fluid (air) can be measured. An ultrasonic speed sensor can measure fluid velocity.

Figure 5:
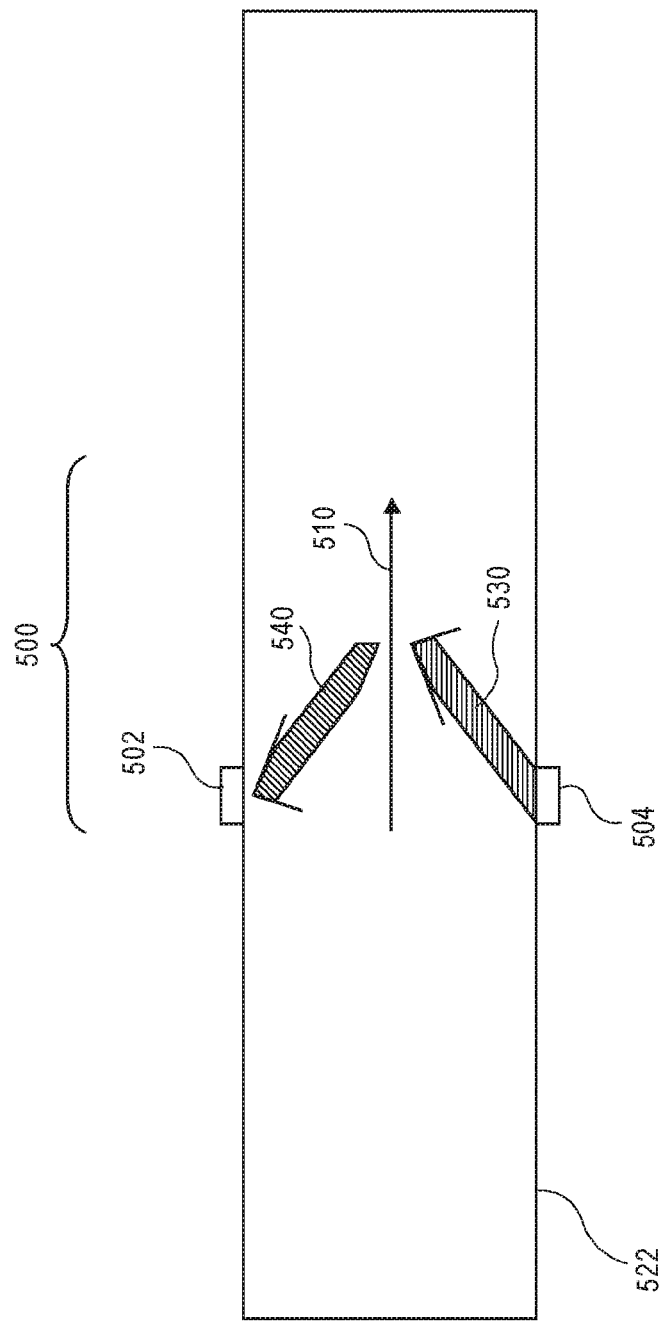
FIG. 5 illustrates a secondary product line having an ultrasonic sensor according to one embodiment.

FIG. 5 illustrates an ultrasonic sensor for detecting flow through a product line or pipe in accordance with one embodiment. The ultrasonic sensor 500 is positioned on a line 522 (e.g., secondary product line) or pipe 522 or in close proximity to the line 522 or pipe 522. The sensor (or ultrasonic flowmeter) uses acoustic waves or vibrations of a certain frequency (e.g., greater than 20 kHz, approximately 0.5 MHz). The sensor 500 uses either wetted or nonwetted transducers on the line or pipe perimeter to couple ultrasonic energy with the fluid flowing in the line or pipe. In one example, the sensor operates with the Doppler effect in which a transducer 504 having a transmitter transmits a beam 530. A transmitted frequency of the beam 530 is altered linearly by being reflected from particles and bubbles with a fluid that is within the line 522 to generate a Doppler reflection 540 that is received by a receiver of a transducer 502. A frequency shift between a frequency of the beam 530 and a frequency of the reflection 540 can be directly related to a flow rate of a fluid (e.g., liquid, air) having a flow direction 510. The frequency shift is linearly proportional to the rate of flow of materials in the line or pipe and can be used to generate an analog or digital signal that is proportional to flow rate of the fluid.

With an inside diameter (D) of a line 522 or pipe 522 being known, a volumetric flow rate (e.g., gallons per minute) equals $K*Vf*D_2$. In this example, Vf is flow velocity and K is a constant dependent on units of Vf and D.

Figure 6:
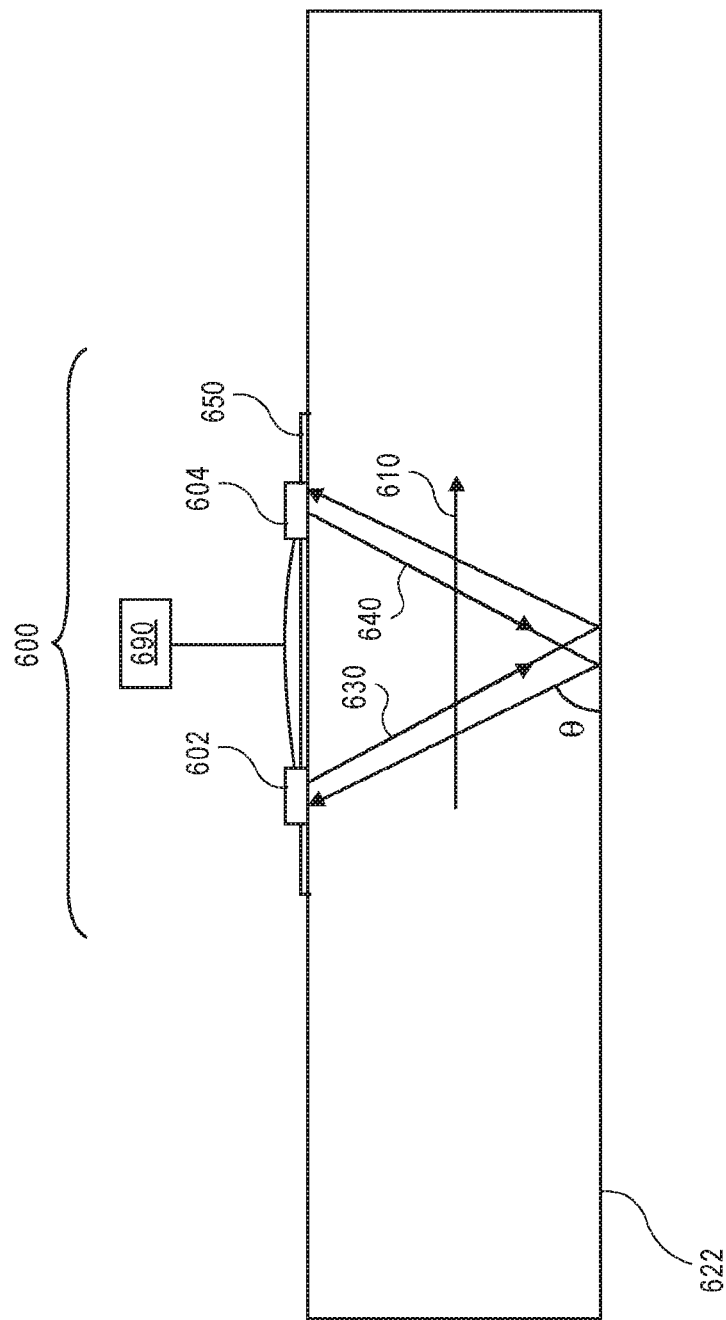
FIG. 6 illustrates a secondary product line having an ultrasonic sensor according to another embodiment.

FIG. 6 illustrates an ultrasonic sensor (e.g., transit-time flowmeter) for detecting flow through a product line or pipe in accordance with one embodiment. Transit-time flowmeters (e.g., time of flight flowmeter, time of travel flowmeter) measure a difference in travel time between pulses transmitted in a single path along and against a flow of fluid (e.g., liquid, air). The sensor 600 has a case 650 with transducers 602 and 604. The sensor 600 is positioned on a line 622 (e.g., secondary product line) or pipe 622 or in close proximity to the line 622 or pipe 522.

In one example as illustrated in FIG. 6, the sensor operates with transducers 602 and 604. Each transducer having a transmitter and a receiver alternately transmits and receives bursts of ultrasonic energy as beams 630 and 640 at an angle theta (e.g., approximately 45 degrees). A difference in transit times in upstream versus downstream directions (Tu-Td) measured over a same path can be used to calculate a flow through the line or pipe:

$$V = K*D/\sin 2\theta * 1/(T0-\tau)^2 \text{ delta } T$$

V is a mean velocity of flowing fluid, K is a constant, D is a diameter of the line or pipe, theta is an incident angle of ultrasonic burst waves, TO is zero flow transit time, delta T is T2-T1, T1 is transit time of burst waves (beam 630) from transducer 602 to transducer 604, T2 is transit time of burst waves (beam 640) from transducer 604 to transducer 602, and tau is transmit time of burst waves through the line 622 or pipe. The flow velocity is directly proportional to a measured different between upstream and downstream transit times. A measure of volumetric flow is determined by multiplying a cross-section area of the line or pipe with flow velocity. The volumetric flow can be determined with an optional micro-processor based converter 690 or the electrical control system 300 or 350. The fluid having a flow path 610 needs to be a reasonable conductor of sonic energy.

As previously discussed, seed or fertilizer sensors on agricultural equipment have typically been optical sensors. When a particle (seed or fertilizer) passes through the optical sensor a light beam is broken and a particle is then detected. The frequency of these particle detections can be used to determine planting populations if the frequency is low enough. However, for higher flow crops like wheat or fertilizer, typical optical sensors sizes of 25 mm or 32 mm do not have a large enough cross-sectional area to sense individual particles, therefore making the particle counts from these sensors unreliable and inaccurate. For this reason, optical sensors which will be used on implements experiencing these higher frequency rates (like air seeders) are called blockage sensors because these sensors can only report if they see particles or not.

Blockage sensors used on air seeds do not report enough seed pulses to report seeds/acre properly. Air seeders use a "seed distribution" metric that displays population without units. This can be an issue when the seeding rate too high, and the voltage pull down on the sensor wasn't happening as often, resulting in a lower population reported.

However, for a given sensor and particle type (e.g., corn, wheat, sorghum, barley, oats, canola, fertilizer, etc.), a relationship (as described below) can be measured between the time the optical sensor detects a particle and the actual particle frequency. If this relationship can be derived for certain particles, the measured duty cycle of the optical sensor can be used to calculate an estimated particle frequency, which than can used to calculate an estimated population based on other known variables like row speed, row spacing.

The duty cycle of a flow optical sensor can be used to calculate an estimated product or particle frequency, which than can used to calculate an estimated population based on other known variables like row speed or row spacing.

By knowing the duty cycle of the sensor, other mathematics can be done to generate useful metrics like "Relative Frequency" that a user (e.g., operator, farmer) can use to compare the number of particles going to each row on the implement and identify mechanical issues causing the row to row variation.

To estimate seed population for a given sensor and particle type (e.g., corn, wheat, sorghum, barley, oats, canola, fertilizer, etc.), a method may need to calibrate a delay from the sensor to the ground. However, it may be difficult to calibrate this delay if factors in-field change the delay and also if varying length of secondary product lines occur after the sensor for different row units. The new formulas described below eliminate a need for a time window for this delay from the sensor to the ground and result in simple mathematical expressions.

For the methods described below, the following are definitions of terms:

particle_frequency: (Hz) Number of particles going past the sensor divided by the total time;

pulse_frequency: (Hz) (input) Number of pulses detected by the sensor divided by the total time;

particle_impulse: (seconds) Duration of the sensor signal generated by one particle;

duty_cycle: (unitless fraction) (input) Fraction of the time that the sensor is sensing particles.

Formulas:

$$\text{Ⓐ  particle\_frequency} = \frac{\text{pulse\_frequence}}{1 - \text{duty\_cycle}}$$

$$\text{Ⓑ  particle\_impulse} = -\ln(1 - \text{duty\_cycle}) \cdot \frac{1 - \text{duty\_cycle}}{\text{pulse\_frequency}}$$

$$\text{Ⓒ  particle\_frequency} = \frac{-\ln(1 - \text{duty\_cycle})}{\text{particle\_impulse}}$$

Particle frequency: Approximates the frequency of particles passing through the sensor based on duty cycle and pulse frequency calculations.

Particle impulse: Approximates the excitation of the sensor from a single particle of average size moving at average speed based on duty cycle and pulse frequency calculations. The particle impulse is designed to have a single pulse per particle.

Particle frequency: Approximates the frequency of particles passing through the sensor based on duty cycle and particle impulse calculations.

Figure 8:
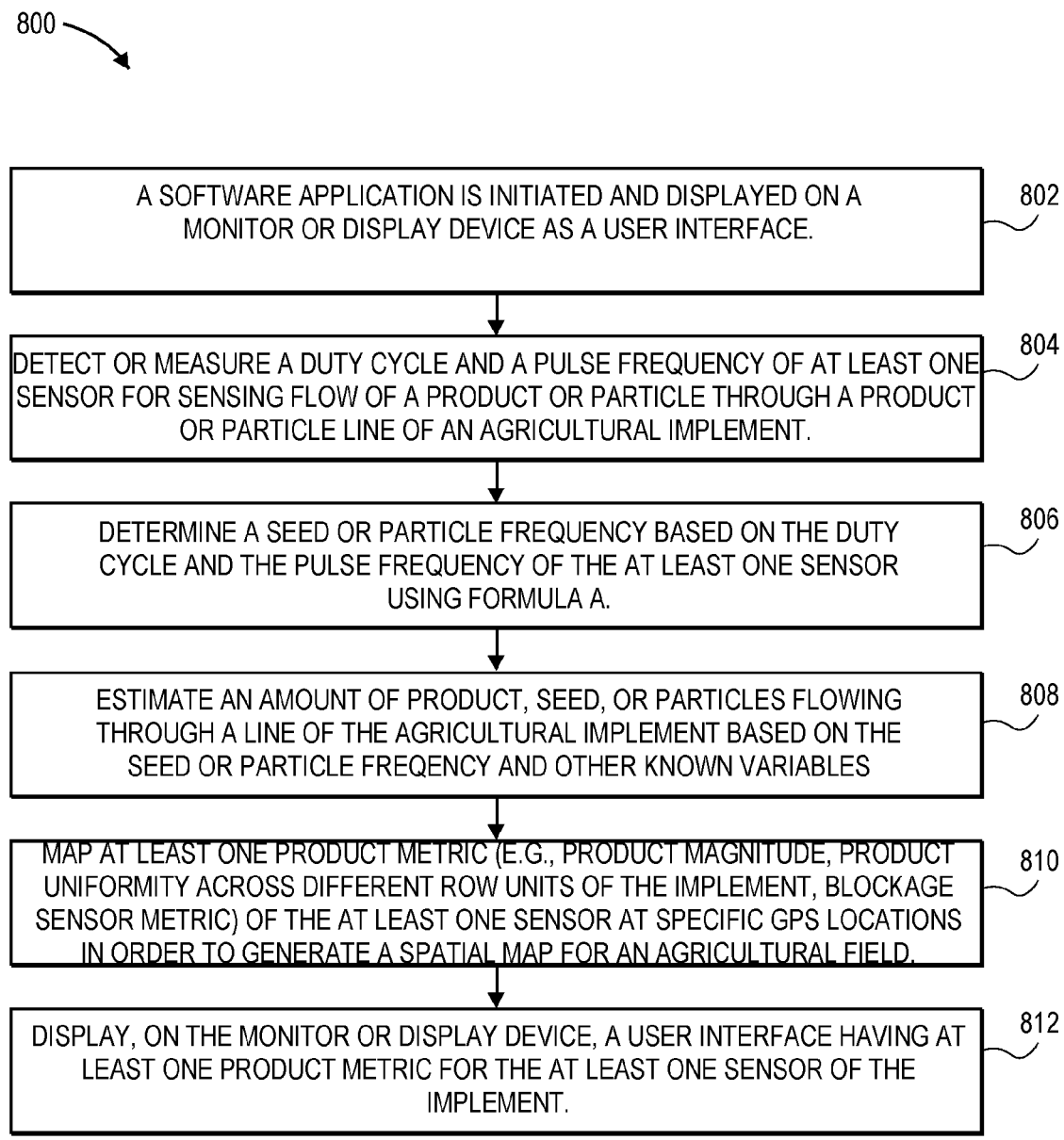
FIG. 8 illustrates a flow diagram of one embodiment for a computer implemented method 800 of determining duty cycle and pulse frequency to estimate produce metrics.

FIG. 8 illustrates a flow diagram of one embodiment for a computer implemented method 800 of determining duty cycle and pulse frequency to estimate product metrics. The method 800 is performed by processing logic that may comprise hardware (circuitry, dedicated logic, etc.), software (such as is run on a general purpose computer system or a dedicated machine or a device), or a combination of both. In one embodiment, the method 800 is performed by processing logic (e.g., processing logic 316) of an electrical control system (e.g., electrical control system 300, electrical control system 350, machine, apparatus, monitor 310 having CPU 316, module 320, display device, user device, self-guided device, self-propelled device, etc). The electrical control system or processing system (e.g., processing system 1220, 1262) executes instructions of a software application or program with processing logic. The software application or program can be initiated by the electrical control system. In one example, a monitor or display device receives user input and provides a customized display for operations of the method 800.

At operation 802, a software application is initiated and displayed on a monitor or display device as a user interface. The electrical control system or processing system may be integrated with or coupled to a machine that performs an application pass (e.g., planting, tillage, fertilization). Alternatively, the electrical control system or processing system may be integrated with an apparatus (e.g., drone, image capture device) associated with the machine that captures images during the application pass.

At operation 804, the computer implemented method detects or measures a duty cycle and a pulse frequency from a sensor output of at least one sensor (e.g., optical sensors, sensors 140, 150-1, 150-2, 171, transducers 502, 504, 602, 604) for sensing flow of seed or particles through a seed or particle line of an agricultural implement. This line supplies the seed or particle to an agricultural field.

At operation 806, the computer implemented method determines a seed or particle frequency based on the detected or measured pulse frequency and duty cycle using formula A. At operation 808, the computer implemented method estimates an amount of product, seed, or particles flowing through a line of the agricultural implement based on the particle frequency and other known variables like row speed or row spacing for an implement. At operation 810, the method maps at least one product metric (e.g., product magnitude, product uniformity across different row units of the implement, blockage sensor metric) of the at least one sensor at specific GPS locations in order to generate a spatial map for an agricultural field.

At operation 812, a monitor or display device displays on a user interface at least one product metric and range for the product metric for the at least one sensor for the implement.

Figure 9:
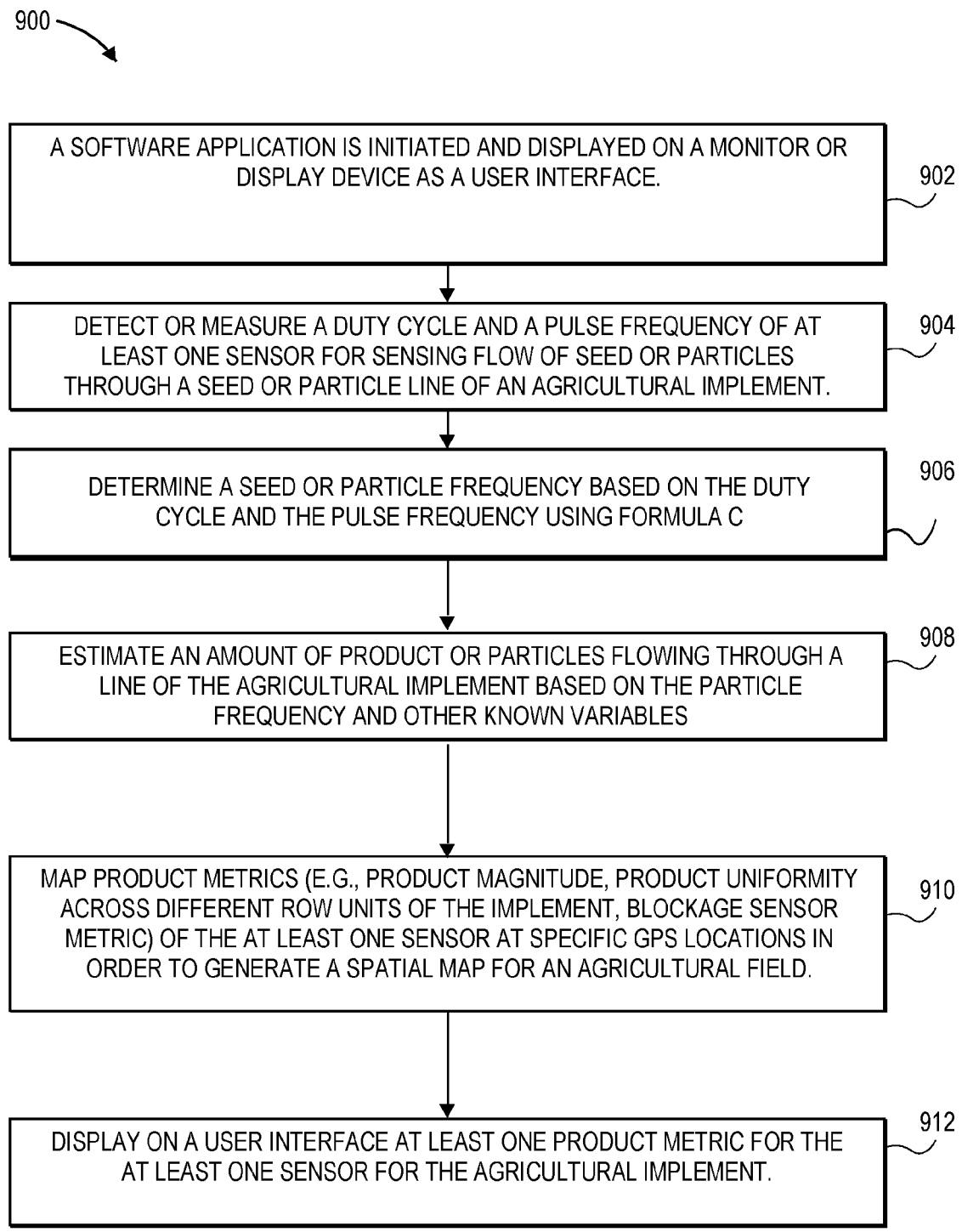
FIG. 9 illustrates a flow diagram of one embodiment for a computer implemented method 900 of determining duty cycle and pulse frequency to estimate product metrics.

FIG. 9 illustrates a flow diagram of one embodiment for a computer implemented method 900 of determining duty cycle and pulse frequency to estimate product metrics. The method 900 is performed by processing logic that may comprise hardware (circuitry, dedicated logic, etc.), software (such as is run on a general purpose computer system or a dedicated machine or a device), or a combination of both. In one embodiment, the method 900 is performed by processing logic (e.g., processing logic 316) of an electrical c control system (e.g., electrical control system 300, electrical control system 350, machine, apparatus, monitor 310 having CPU 316, module 320, display device, user device, self-guided device, self-propelled device, etc). The electrical control system or processing system (e.g., processing system 1220, 1262) executes instructions of a software application or program with processing logic. The software application or program can be initiated by the electrical control system. In one example, a monitor or display device receives user input and provides a customized display for operations of the method 900.

At operation 902, a software application is initiated and displayed on a monitor or display device as a user interface. The electrical control system or processing system may be integrated with or coupled to a machine that performs an application pass (e.g., planting, tillage, fertilization). Alternatively, the electrical control system or processing system may be integrated with an apparatus (e.g., drone, image capture device) associated with the machine that captures images during the application pass.

At operation 904, the computer implemented method detects or measures a duty cycle and a pulse frequency from a sensor output of at least one sensor (e.g., optical sensors, sensors 140, 150-1, 150-2, 171, transducers 502, 504, 602, 604) for sensing flow of seed or particles through a seed or particle line of an agricultural implement. This line supplies the seed or particle to an agricultural field.

At operation 906, the computer implemented method determines a particle frequency based on the detected or measured pulse frequency and duty cycle using formula C.

At operation 908, the computer implemented method estimates an amount of product, seed, or particles flowing through a line of the agricultural implement based on the seed or particle frequency and other known variables like row speed or row spacing for an implement. At operation 910, the method maps product metrics (e.g., product magnitude, product uniformity across different row units of the implement, blockage sensor metric) of the at least one sensor at specific GPS locations in order to generate a spatial map for an agricultural field.

At operation 912, a monitor or display device displays on a user interface at least one product metric and range for the product metric for the at least one sensor for the implement.

The formulas A and C can be used to determine seed or particle frequency with different methods. Formulas B and C can be used to smooth out results over a long time period.

Figure 10:
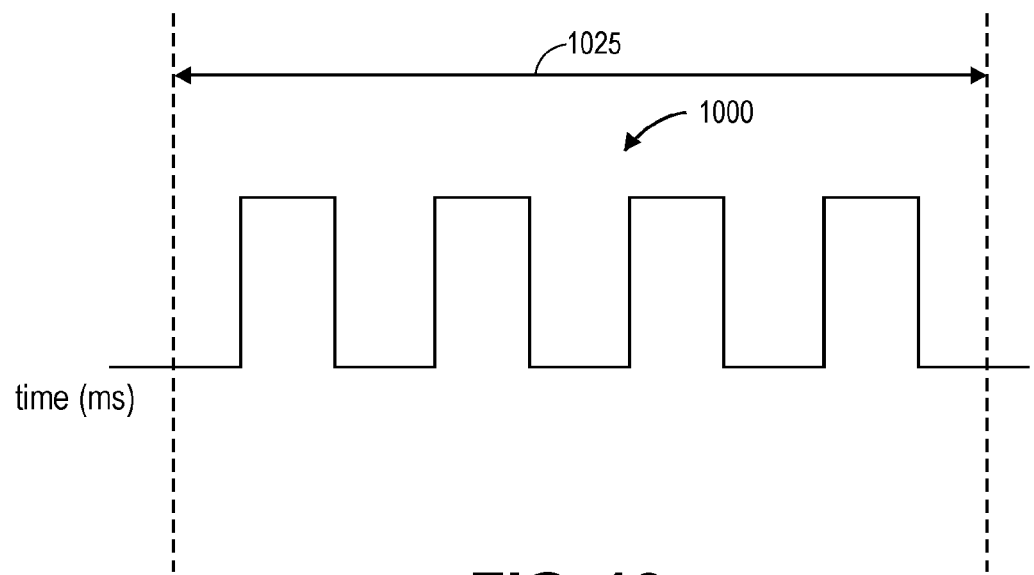
FIG. 10 illustrates a signal of a sensor during a time period in accordance with one embodiment.

FIG. 10 illustrates a signal of a sensor during a time period in accordance with one embodiment. The pulses of the signal 1000 during the time period 1025 are used to measure a pulse frequency. In one example, 4 pulses per a 200 millisecond time period results in a pulse frequency of 20 Hertz and corresponds to a duty cycle of a blockage sensor of approximately 40%. A particle frequency can be calculated to be 33 seeds or particles per second using formula A.

Figure 11:
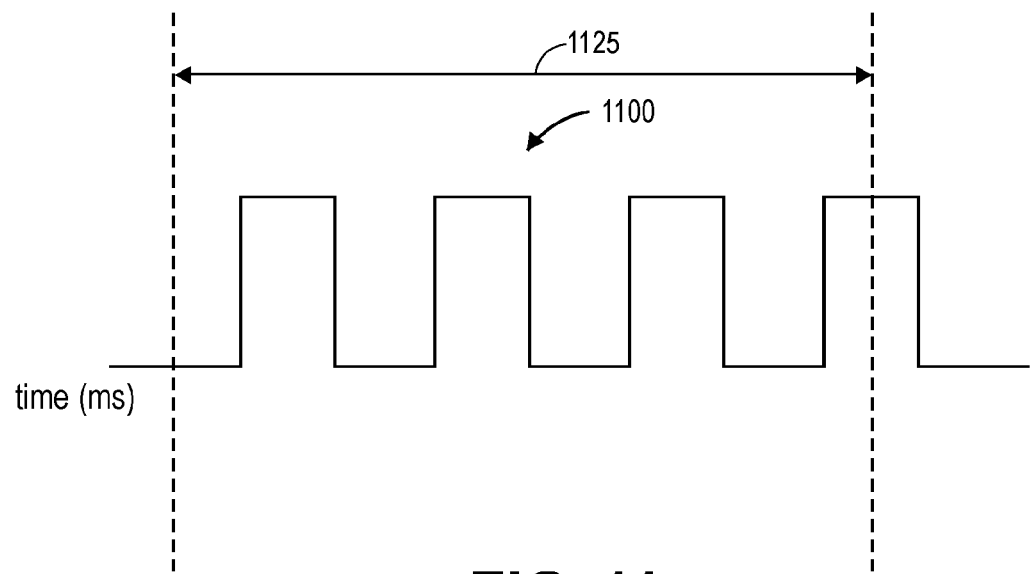
FIG. 11 illustrates a signal of a sensor during a time period in accordance with another embodiment.

FIG. 11 illustrates a signal of a sensor during a time period in accordance with another embodiment. The pulses of the signal 1100 during the time period 1125 are used to measure a pulse frequency. In another example, the end of the time period 1125 straddles a pulse. Any straddled pulse can be counted as half of a pulse to determine 3.5 pulses per a 200 millisecond time period and this results in a pulse frequency of 17.5 Hertz. A pulse count can be determined based on a rising edge of a pulse or alternatively a falling edge of a pulse.

A blockage metric for a sensor is a status of particles being detected or not detected. This can be indicated with a visual indication such as a bar or box. The detection is within an "n" period of time, and the time can be selected by the user to adjust the sensitivity of the metric. In one embodiment, a green bar can be used when a pulse has been detected during the period of time, and a red bar can be used when no pulse has been detected. This can be displayed on the display device. Also, a map can be generated tied to GPS coordinates in the field showing whether there was or was not blockage at a location.

Product Magnitude Metric is a relative measurement comparing the amount of product being applied in a given area. This can be a replacement for population metric (seeds per acre). The product magnitude metric is calculated as duty cycle/area. The range for the metric is between 0 and 100% can be scaled to a different number. For example, the range could be 0-10,000 with 10,000 representing 100%. Alerts can be created, such as 10%, 20%, 30%, 40%, any custom number between 0 and 100%, or disabled. In one example, an alert (yellow indication) can be created for 20% and an alarm (red indication) at 40%. This can be displayed on the display device. Also, a map can be generated tied to GPS coordinates in the field.

Product Uniformity Metric is a measure of how uniform the product magnitude is across the implement. Product Uniformity can be calculated as follows:

$$\text{Product Uniformity (\%)}=100-(\text{High Row Product Variation}+\text{Absolute Value of Low Row Product Variation}).$$

One hundred percent is perfect.

$$\text{Low Row Product Variation (\%)}=(\text{Low Row Product Magnitude}-\text{Avg Product Magnitude})/\text{Avg Product Magnitude}*100.$$

This will be a negative number.

$$\text{High Row Product Uniformity}=(\text{High Row Product Magnitude}-\text{Avg Product Magnitude})/\text{Avg Product Magnitude}*100.$$

This will be a positive number. The range will be −100% to +100%. This can provide an overall measurement of uniformity, and it can determine which rows are the worst. This can be displayed on the display device. Also, a map can be generated tied to GPS coordinates in the field. Alerts can be created based on any number in the range. With 100% being perfect, in one example, an alert (yellow indication) can be created at 40%, and an alarm can be created (red indication) at 20%.

Figure 12:
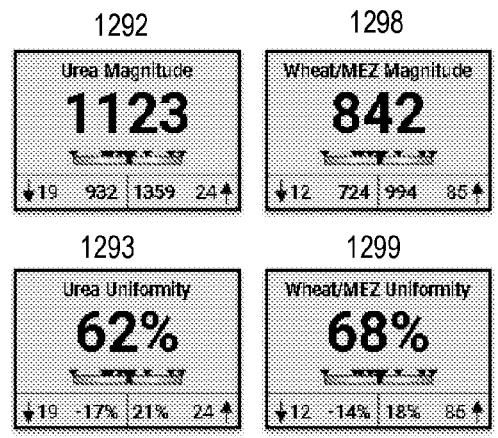
FIG. 12 illustrates a monitor or display device having a user interface 1201 with customized product metrics including product magnitude and product uniformity in accordance with one embodiment.

FIG. 12 illustrates a monitor or display device having a user interface 1201 with customized product metrics including product magnitude and product uniformity in accordance with one embodiment. An initiated software application (e.g., field application) of an electronic control system or a processing system generates the user interface 1201 that is displayed by the monitor or display device.

The software application can provide different display regions that are selectable by a user. In one example, the display regions include a standard option, a metrics option, and a large map option to control sizing of a displayed map in a field region. Also, in one example, the display regions include a urea magnitude metric 1292, a urea uniformity 1293, a wheat magnitude 1298, and a wheat uniformity 1299. A magnitude metric represents an amount of product that is applied per area. A product uniformity represents a percentage of variation across different row units of a tool or implement.

Figure 13:
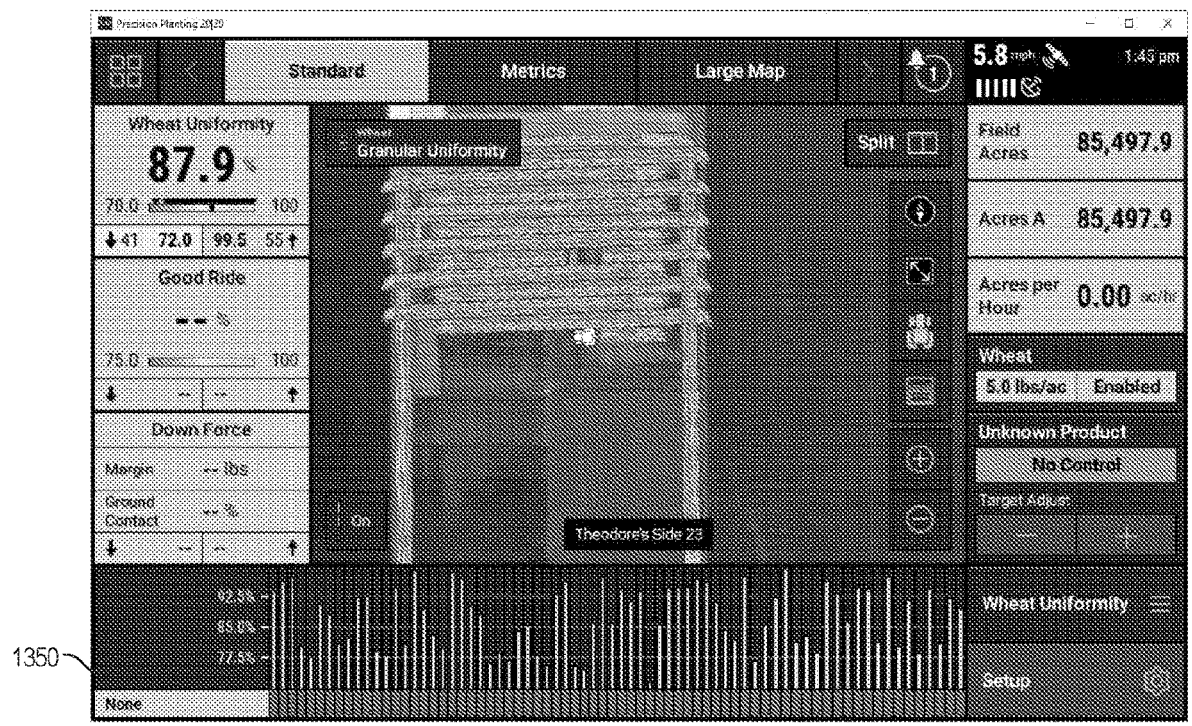
FIG. 13 illustrates a monitor or display device having a user interface with customized product metrics for an agricultural implement in accordance with one embodiment.

FIG. 13 illustrates a monitor or display device having a user interface with customized product metrics for an agricultural implement in accordance with one embodiment. An initiated software application (e.g., field application) of a processing system generates the user interface 1301 that is displayed by the monitor or display device.

The software application can provide different display regions that are selectable by a user. In one example, upon selection of a product metric, the user interface 1301 having wheat uniformity is generated.

The DMC region 1350 includes normalized values with the wheat uniformity being calculated as:

$$\text{Product Uniformity (\%)}=100-(\text{High Row Product Variation}+\text{Absolute Value of Low Row Product Variation}).$$

The monitor or display device can also display any of the parameters or metrics discussed herein (e.g., product magnitude, product uniformity, blockage, sensor output, estimated flow, total seeds, average seeds, population) in combination with one or more of implement data including down force data, soil testing implement data (such as soil moisture data, organic matter data, soil temperature data), and trench closing data.

Exemplary metrics include high row, low row, and average (for any value) metrics, population (including the commanded population rate and the actual population rate), singulation, skips, multiples, smooth ride (good ride), good spacing, downforce, ground contact, speed, and vacuum. FIGS. 5 and 6 in U.S. Pat. Nos. 8,078,367, 9,955,625, and 6,070,539, which are incorporated by reference herein, provides examples of some of these same metrics. U.S. Pat. Nos. 8,078,367 and 9,955,625 are incorporated by reference herein.

Figure 14:
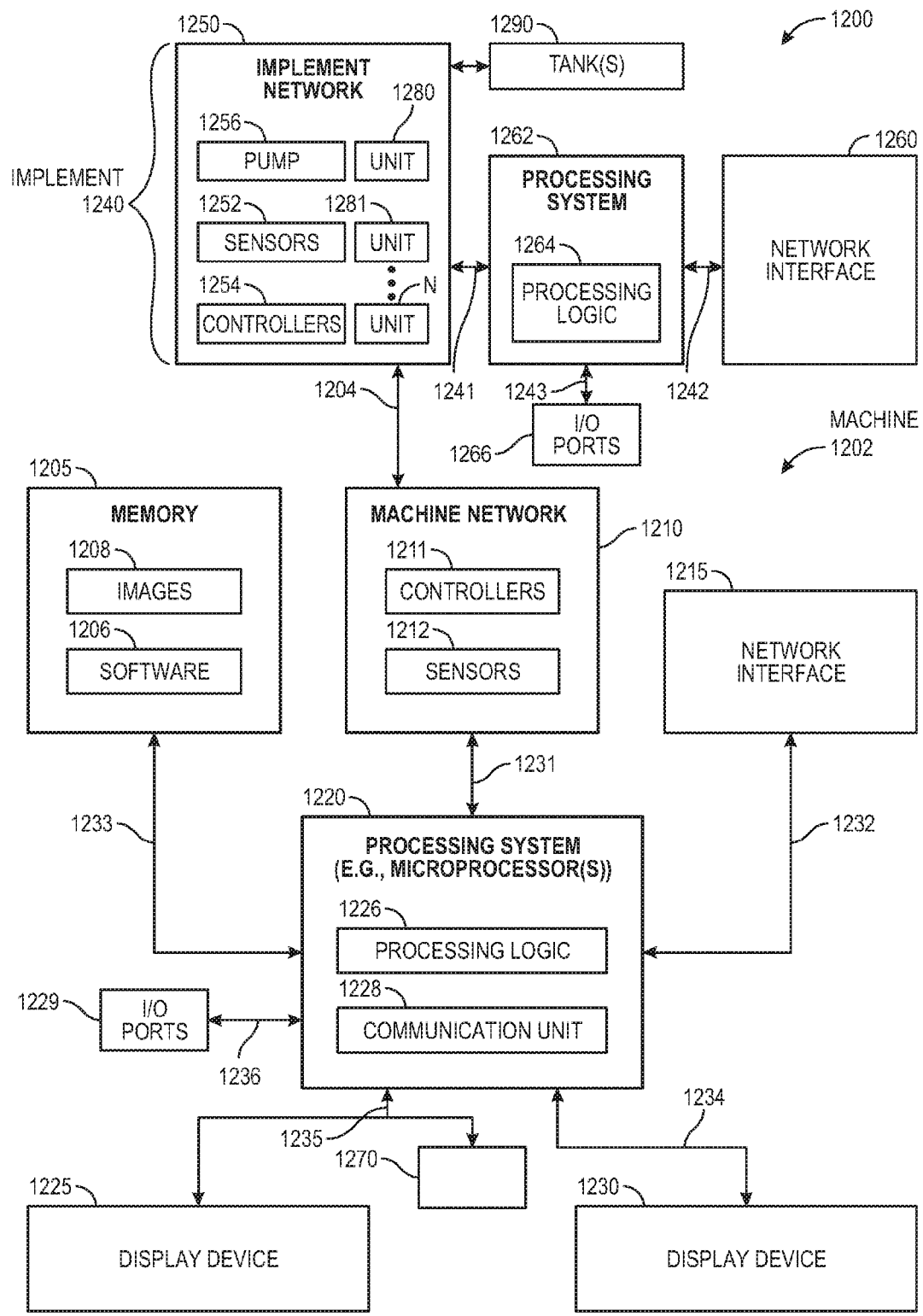
FIG. 14 shows an example of a system 1200 that includes a machine 1202 (e.g., tractor, combine harvester, etc.) and an implement 1240 (e.g., planter, sidedress bar, cultivator, plough, sprayer, spreader, irrigation implement, etc.) in accordance with one embodiment.

FIG. 14 shows an example of a system 1200 that includes a machine 1202 (e.g., tractor, combine harvester, etc.) and an implement 1240 (e.g., planter, sidedress bar, cultivator, plough, sprayer, spreader, irrigation implement, etc.) in accordance with one embodiment. The machine 1202 includes a processing system 1220, memory 1205, machine network 1210 (e.g., a controller area network (CAN) serial bus protocol network, an ISOBUS network, etc.), and a network interface 1215 for communicating with other systems or devices including the implement 1240. The machine network 1210 includes sensors 1212 (e.g., speed sensors, optical sensors), controllers 1211 (e.g., GPS receiver, radar unit) for controlling and monitoring operations of the machine or implement. The network interface 1215 can include at least one of a GPS transceiver, a WLAN transceiver (e.g., WiFi), an infrared transceiver, a Bluetooth transceiver, Ethernet, or other interfaces from communications with other devices and systems including the implement 1240. The network interface 1215 may be integrated with the machine network 1210 or separate from the machine network 1210 as illustrated in FIG. 12. The I/O ports 1229 (e.g., diagnostic/on board diagnostic (OBD) port) enable communication with another data processing system or device (e.g., display devices, sensors, etc.).

In one example, the machine performs operations of a tractor that is coupled to an implement for planting applications and seed or particle sensing during an application. The planting data and seed/particle data for each row unit of the implement can be associated with locational data at time of application to have a better understanding of the planting and seed/particle characteristics for each row and region of a field. Data associated with the planting applications and seed/particle characteristics can be displayed on at least one of the display devices 1225 and 1230. The display devices can be integrated with other components (e.g., processing system 1220, memory 1205, etc.) to form the monitor.

The processing system 1220 may include one or more microprocessors, processors, a system on a chip (integrated circuit), or one or more microcontrollers. The processing system includes processing logic 1226 for executing software instructions of one or more programs and a communication unit 1228 (e.g., transmitter, transceiver) for transmitting and receiving communications from the machine via machine network 1210 or network interface 1215 or implement via implement network 1250 or network interface 1260. The communication unit 1228 may be integrated with the processing system or separate from the processing system. In one embodiment, the communication unit 1228 is in data communication with the machine network 1210 and implement network 1250 via a diagnostic/OBD port of the I/O ports 1229.

Processing logic 1226 including one or more processors or processing units may process the communications received from the communication unit 1228 including agricultural data (e.g., GPS data, planting application data, soil characteristics, any data sensed from sensors of the implement 1240 and machine 1202, etc.). The system 1200 includes memory 1205 for storing data and programs for execution (software 1206) by the processing system. The memory 1205 can store, for example, software components such as planting application software or seed/particle software for analysis of seed/particle and planting applications for performing operations of the present disclosure, or any other software application or module, images (e.g., captured images of crops, seed, soil, furrow, soil clods, row units, etc.), alerts, maps, etc. The memory 1205 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 1220 communicates bi-directionally with memory 1205, machine network 1210, network interface 1215, display device 1230, display device 1225, and I/O ports 1229 via communication links 1231-1236, respectively. The processing system 1220 can be integrated with the memory 1205 or separate from the memory 1205.

Display devices 1225 and 1230 can provide visual user interfaces for a user or operator. The display devices may include display controllers. In one embodiment, the display device 1225 is a portable tablet device or computing device with a touchscreen that displays data (e.g., planting application data, captured images, localized view map layer, high definition field maps of different measured seed/particle data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 1230 may be a display (e.g., display provided by an original equipment manufacturer (OEM)) that displays images and data for a localized view map layer, measured seed/particle data, as-applied fluid application data, as-planted or as-harvested data, yield data, seed germination data, seed environment data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 1270 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 1240 (e.g., planter, cultivator, plough, sprayer, spreader, irrigation implement, etc.) includes an implement network 1250, a processing system 1262, a network interface 1260, and optional input/output ports 1266 for communicating with other systems or devices including the machine 1202. The implement network 1250 (e.g., a controller area network (CAN) serial bus protocol network, an ISOBUS network, etc.) includes a pump 1256 for pumping fluid from a storage tank(s) 1290 to application units 1280, 1281, ... N of the implement, sensors 1252 (e.g., radar, electroconductivity, electromagnetic, a force probe, speed sensors, seed/particle sensors for detecting passage of seed/particle, sensors for detecting characteristics of soil or a trench including a plurality of soil layers differing by density, a depth of a transition from a first soil layer to a second soil layer based on density of each layer, a magnitude of a density layer difference between soil layers, a rate of change of soil density across a depth of soil, soil density variability, soil surface roughness, residue mat thickness, a density at a soil layer, soil temperature, seed presence, seed spacing, percentage of seeds firmed, and soil residue presence, at least one optical sensor to sense at least one of soil organic matter, soil moisture, soil texture, and soil cation-exchange capacity (CEC), downforce sensors, actuator valves, moisture sensors or flow sensors for a combine, speed sensors for the machine, seed force sensors for a planter, fluid application sensors for a sprayer, or vacuum, lift, lower sensors for an implement, flow sensors, etc.), controllers 1254 (e.g., GPS receiver), and the processing system 1262 for controlling and monitoring operations of the implement. The pump controls and monitors the application of the fluid to crops or soil as applied by the implement. The fluid application can be applied at any stage of crop development including within a planting trench upon planting of seeds, adjacent to a planting trench in a separate trench, or in a region that is nearby to the planting region (e.g., between rows of corn or soybeans) having seeds or crop growth.

For example, the controllers may include processors in communication with a plurality of seed sensors. The processors are configured to process data (e.g., fluid application data, seed sensor data, soil data, furrow or trench data) and transmit processed data to the processing system 1262 or 1220. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 1260 can be a GPS transceiver, a WLAN transceiver (e.g., WiFi), an infrared transceiver, a Bluetooth transceiver, Ethernet, or other interfaces from communications with other devices and systems including the machine 1202. The network interface 1260 may be integrated with the implement network 1250 or separate from the implement network 1250 as illustrated in FIG. 24.

The processing system 1262 communicates bi-directionally with the implement network 1250, network interface 1260, and I/O ports 1266 via communication links 1241-1243, respectively.

The implement communicates with the machine via wired and possibly also wireless bi-directional communications 1204. The implement network 1250 may communicate directly with the machine network 1210 or via the network interfaces 1215 and 1260. The implement may also by physically coupled to the machine for agricultural operations (e.g., seed/particle sensing, planting, harvesting, spraying, etc.).

The memory 1205 may be a machine-accessible non-transitory medium on which is stored one or more sets of instructions (e.g., software 1206) embodying any one or more of the methodologies or functions described herein. The software 1206 may also reside, completely or at least partially, within the memory 1205 and/or within the processing system 1220 during execution thereof by the system 1200, the memory and the processing system also constituting machine-accessible storage media. The software 1206 may further be transmitted or received over a network via the network interface 1215.

In one embodiment, a machine-accessible non-transitory medium (e.g., memory 1205) contains executable computer program instructions which when executed by a data processing system cause the system to perform operations or methods of the present disclosure. While the machine-accessible non-transitory medium (e.g., memory 1205) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

What is claimed is:

1. An electrical control system comprising:
   a display device to display data;
   at least one sensor to measure a duty cycle of a fraction of time that the at least one sensor is sensing product or particles and to measure a pulse frequency for sensing flow of a product or particle through a product or particle line of an agricultural implement; and
   processing logic coupled to the at least one sensor, the processing logic is configured to determine an amount of product or particles flowing through the product or particle line of the agricultural implement based on the measured duty cycle and the measured pulse frequency of the at least one sensor.

2. The electrical control system of claim 1, wherein the processing logic is configured to calculate the product or particle frequency through the product or particle line based on the pulse frequency and the duty cycle.

3. The electrical control system of claim 2, wherein the product or particle frequency is used to estimate an estimated product or particle population based on known variables including row speed and row spacing for rows within an agricultural field.

4. The electrical control system of claim 2, wherein the product or particle frequency equals the pulse frequency divided by 1—duty cycle.

5. The electrical control system of claim 1, wherein the processing logic is configured to calculate a particle impulse to indicate a pulse per particle based on the duty cycle and the pulse frequency.

6. The electrical control system of claim 5, wherein the processing logic is configured to calculate a particle frequency based on the duty cycle and the particle impulse.

7. The electrical control system of claim 1, wherein the processing logic is configured to determine a product or particle magnitude metric based on duty cycle per area and to map the product or particle magnitude metric based on the amount of product or particles determined at different GPS locations in order to generate a spatial map for an agricultural field.

8. The electrical control system of claim 7, wherein the processing logic is configured to determine a product or particle uniformity metric that is calculated as 100 subtract High Row product or particle Variation plus Absolute Value of Low Row product or particle Variation, wherein the display device to display on a user interface the product or particle uniformity metric which shows a product or particle uniformity of the product or particle magnitude across different row units for the implement with a sensor being positioned per row unit for the implement.

9. An electrical system comprising:
   at least one sensor for sensing flow of seeds or particles within a flow line of an agricultural implement;
   a module to receive sensor data from the at least sensor; and
   processing logic coupled to the module, the processing logic is configured to determine a measured duty cycle of a fraction of time that the at least one sensor is sensing seed or particles and a measured pulse frequency from a sensor output of the at least one sensor and to determine a seed or particle frequency based on the measured duty cycle and the measured pulse frequency of the sensor.

10. The electrical system of claim 9, wherein the processing logic is configured to calculate the seed or particle frequency through the seed or particle line based on the pulse frequency and the duty cycle.

11. The electrical system of claim 10, wherein the seed or particle frequency equals the pulse frequency divided by 1—duty cycle.

12. The electrical system of claim 9, wherein the processing logic is configured to calculate a particle impulse to indicate a pulse per particle based on the duty cycle and the pulse frequency, wherein the processing logic is configured to determine a seed or particle magnitude metric as duty cycle per area and to determine a seed or particle uniformity metric that is calculated as 100 subtract High Row seed or particle Variation plus Absolute Value of Low Row seed or particle Variation.

13. The electrical system of claim 12, wherein the processing logic is configured to calculate a particle frequency based on the duty cycle and the particle impulse.

14. A computer implemented method of monitoring a sensor to
   determine seed or particle metrics, comprising:
   measuring a duty cycle of a fraction of time that the sensor is sensing seed or sensing particles and measuring a pulse frequency of the sensor for sensing flow of seed or particles through a seed or particle line of an agricultural implement;
   determining a seed or particle frequency based on the measured pulse frequency and the measured duty cycle; and estimating an amount of seed or particles flowing through the seed or particle line of the agricultural implement based on the seed or particle frequency and other known variables including row speed or row spacing for the agricultural implement.

15. The computer implemented method of claim 14, further comprising:

mapping at least one seed or particle metric including a magnitude or uniformity across different row units of the agricultural implement of at least one sensor at specific GPS locations in order to generate a spatial map for an agricultural field.

16. The computer implemented method of claim 14, further comprising:

mapping a blockage sensor metric from each blockage sensor across different row units of the agricultural implement at specific GPS locations in order to generate a blockage spatial map for an agricultural field.

17. The computer implemented method of claim 14, further comprising:

determining a seed or particle magnitude metric as duty cycle per area.

18. The computer implemented method of claim 14, further comprising:

determining a seed or particle uniformity metric to measure how uniform the seed or particle magnitude is across different row units of the agricultural implement.

19. The computer implemented method of claim 18, wherein the seed or particle uniformity metric is calculated as 100 subtract High Row seed or particle Variation plus Absolute Value of Low Row seed or particle Variation.

20. The computer implemented method of claim 19, wherein the Low Row seed or particle Variation is calculated as Low Row seed or particle Magnitude subtract Average seed or particle Magnitude divided by Average seed or particle Magnitude multiplied by 100.

21. The computer implemented method of claim 19, wherein the High Row seed or particle Uniformity is calculated as High Row seed or particle Magnitude subtract Average seed or particle Magnitude divided by Average seed or particle Magnitude multiplied 100.

* * * * *